(12) United States Patent
Yamasaki et al.

(10) Patent No.: US 12,386,386 B2
(45) Date of Patent: Aug. 12, 2025

(54) ELECTRONIC APPARATUS CAPABLE OF DETECTING UNAUTHORIZED REMOVAL OF SCREWS FROM CHASSIS

(71) Applicant: LENOVO (SINGAPORE) PTE. LTD., Singapore (SG)

(72) Inventors: Seiji Yamasaki, Yokohama (JP); Hideshi Tsukamoto, Yokohama (JP); Minori Takao, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 322 days.

(21) Appl. No.: 18/062,515

(22) Filed: Dec. 6, 2022

(65) Prior Publication Data

US 2023/0251686 A1    Aug. 10, 2023

(30) Foreign Application Priority Data

Feb. 7, 2022  (JP) .................................. 2022-017057

(51) Int. Cl.
    *G06F 1/16*       (2006.01)
    *G06F 21/86*      (2013.01)
    *H05K 5/13*       (2025.01)

(52) U.S. Cl.
    CPC ............ *G06F 1/1616* (2013.01); *G06F 21/86* (2013.01); *H05K 5/13* (2025.01)

(58) Field of Classification Search
    CPC ............ G06F 1/1616; G06F 21/86–88; H05K 5/0008; H05K 5/00; H05K 5/13
    USPC ................................................ 361/679, 550
    See application file for complete search history.

(56) References Cited

U.S. PATENT DOCUMENTS

| | | | | |
|---|---|---|---|---|
| 2008/0310130 | A1* | 12/2008 | Monda ................. | H05K 1/0268 361/752 |
| 2011/0031985 | A1* | 2/2011 | Johnson ............... | H05K 1/0275 324/681 |
| 2013/0327556 | A1* | 12/2013 | Casebolt ............... | G06F 1/1656 16/382 |
| 2016/0011250 | A1* | 1/2016 | Fitzsimmons ....... | H05K 1/0275 361/752 |

(Continued)

FOREIGN PATENT DOCUMENTS

| | | |
|---|---|---|
| JP | 2000099186 A | 4/2000 |
| JP | 2001267762 A | 9/2001 |

(Continued)

OTHER PUBLICATIONS

Platt, Charles: Encyclopedia of Electronic Components (Year: 2017).*

*Primary Examiner* — Imani N Hayman
*Assistant Examiner* — Ross Terry Mularski
(74) *Attorney, Agent, or Firm* — SHIMOKAJI IP (57) ABSTRACT

A screw fixing portion of an electronic apparatus includes a screw, a screw hole formed in a bottom cover to insert the screw therethrough, a stud provided on a top cover to be threaded with the screw, a substrate hole through which the screw is inserted at a point interposed between the bottom cover and the stud at a main substrate, a conductive sponge interposed between the bottom cover and the main substrate and provided around the screw, and a contact pair which is arranged opposite to each other so as to surround the substrate hole on the surface of the main substrate and contacts and conducts with the conductive sponge by fastening the screw.

7 Claims, 8 Drawing Sheets

(56) References Cited

U.S. PATENT DOCUMENTS

2018/0314304 A1* 11/2018 Degner ................ F16B 41/005

FOREIGN PATENT DOCUMENTS

| JP | 2015143917 A | 8/2015 |
| JP | 2022046022 A | 3/2022 |

* cited by examiner

ELECTRONIC APPARATUS CAPABLE OF DETECTING UNAUTHORIZED REMOVAL OF SCREWS FROM CHASSIS

BACKGROUND OF THE INVENTION

Field of the Invention

The present invention relates to an electronic apparatus including an electronic substrate in a chassis in which a first cover and a second cover are fixed by screw fixing portions.

Description of the Related Art

A structure in which two cover members are stacked and connected to be configured in a flat box shape has been widely used for a chassis of an electronic apparatus such as a notebook type personal computer (laptop PC) or a tablet type personal computer (tablet PC).

In the laptop PC, there has been used as a main body chassis provided with a keyboard, a structure body in which top and bottom two cover members are overlapped and both chassis members are screwed. Electronic parts such as a CPU, a memory, a battery, etc. have been housed in the internal space of the structure body.

By the way, the screw can be easily removed with a screwdriver, and anyone can disassemble the cover members and operate the inside. Therefore, a tamper switch may be provided which detects that the cover members have been disassembled to prevent careless operation. When the tamper switch detects that the cover members have been removed, the input of a predetermined password is requested on the screen to enable the prevention of internal operations by unauthorized persons.

[Patent Document 1] Japanese Patent No. 6986607

SUMMARY OF THE INVENTION

The tamper switch as described above requires a certain degree of cost, and it is desirable to omit the tamper switch in order to further reduce the cost of the electronic apparatus. As a unit of omitting the tamper switch, it is only necessary to provide a predetermined electrical configuration to screw fixing portions fixing the two cover members to detect that the screw has been removed.

However, even if a screw removal detection mechanism is provided in one screw fixing portion in a general laptop PC, two cover members can also be rotated relatively about the screw fixing portion provided with the detection mechanism if screws in other screw fixing portions are removed, thus resulting in exposure of the inside. Also, if there is only one screw detection mechanism, there is a concern of erroneous detection.

The present invention has been made in view of the above-described problems. An object of the present invention is to provide an electronic apparatus capable of reliably detecting removal of two cover members.

In order to solve the above-described problems and achieve the object, there is provided an electronic apparatus according to an aspect of the present invention, which has an electronic substrate included in a chassis in which a first cover and a second cover are fixed by a screw fixing portion. The screw fixing portion includes a screw, a screw hole formed in the first cover to insert the screw therethrough, a stud provided on the second cover to be threaded with the screw, a substrate hole through which the screw is inserted at a point interposed between the first cover and the stud at the electronic substrate, a conductor interposed between the first cover or the stud and the electronic substrate and provided around the screw, and a contact pair which is arranged opposite to each other so as to surround the substrate hole on the surface of the electronic substrate on the side facing the conductor and contacts and conducts with the conductor by fastening the screw. The screw fixing portion is provided in a plural number, and a plurality of the contact pairs form a series circuit in which the contact pairs are connected in series. One end of the series circuit is connected to one electrode of a power supply, and the other end of the series circuit is connected to the other electrode of the power supply via a pull resistor and connected to an input terminal of a controller chip.

According to such an electronic apparatus, it is possible to collectively detect the states of the contact pairs in the plurality of screw fixing portions by a voltage applied to the input terminal of the controller chip. Further, since the screw fixing portion is provided in the plural number, even when the two cover members are rotated relatively about one screw fixing portion to expose the inside of the electronic apparatus, the contact pairs of other screw fixing portions become non-conductive and thereby the detection becomes possible. It is thus possible to reliably detect removal of the two cover members.

Each of the screw fixing portions may have a voltage dividing resistor connected in parallel with the contact pair, and the input terminal may be a terminal capable of analog input. By providing the voltage dividing resistor in each contact pair in this way, it is possible to detect the number of points where the contact pairs become non-conductive.

The controller chip may detect the number of points where the contact pair is made non-conductive from a voltage applied to the input terminal, and perform operation restriction processing when the number of points is two or more. Thus, if only one contact pair is non-conductive, no operation restriction processing is performed, and erroneous detection and erroneous processing can be prevented.

The resistance value of each of the voltage dividing resistors may differ from the total resistance value of any one or more of the other voltage dividing resistors excluding itself. According to such a configuration, it is possible to identify the point of the contact pair brought into non-conduction.

The conductor may be a conductive sponge. The conductive sponge is suitable because it has conductivity and elasticity.

The chassis may be rectangular, and the screw fixing portions may be provided at points along at least three edges of the chassis. Since the three edges are different in vibration mode, even if one contact pair becomes non-conductive due to the effect when some kind of vibration is applied, other points will not be affected by the vibration, and thereby erroneous detection can be prevented.

According to the above-described aspect of present invention, since the screw fixing portion is provided in a plural number, it is possible to reliably detect removal of the first cover and the second cover.

DETAILED DESCRIPTION OF THE INVENTION

An embodiment of an electronic apparatus according to the present invention will hereinafter be described in detail with reference to the accompanying drawings. Incidentally, the present invention is not limited by this embodiment.

Figure 1:
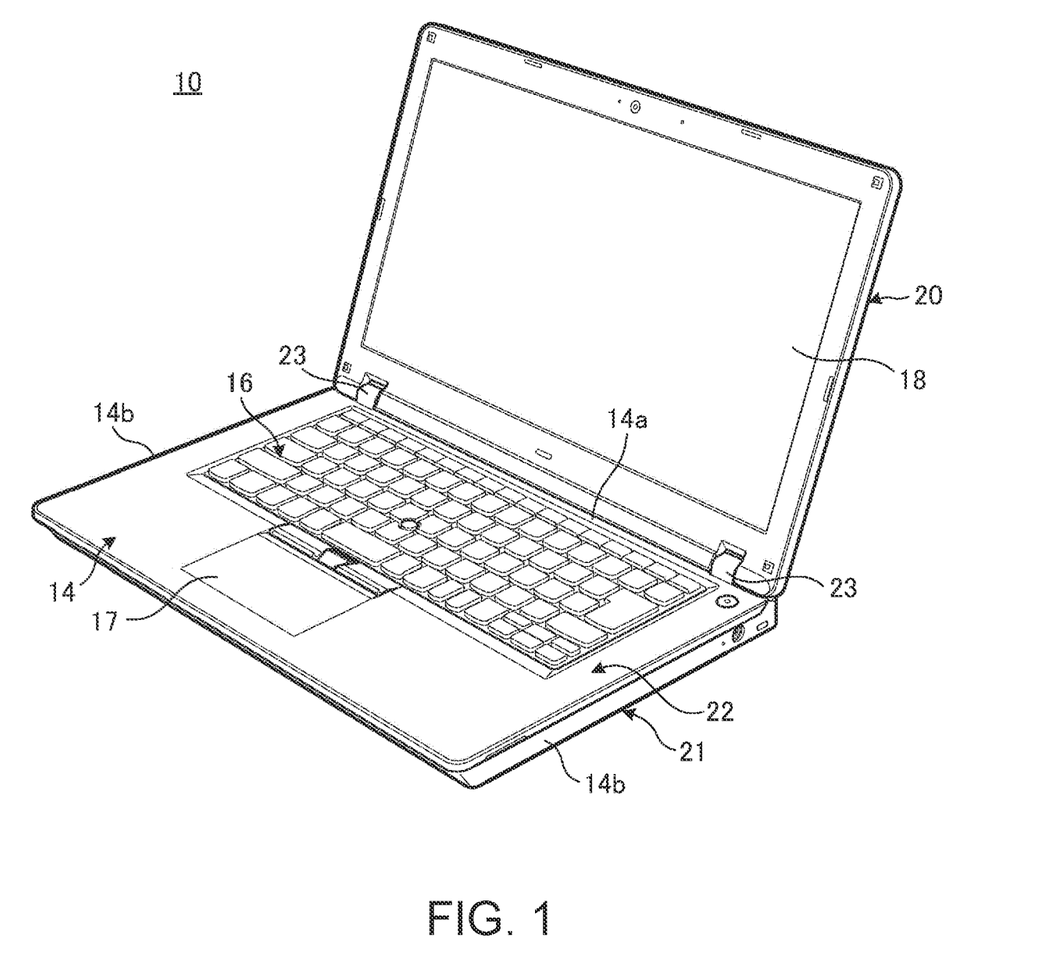
FIG. 1 is a perspective view of an electronic apparatus according to an embodiment of the present invention.

FIG. 1 is a perspective view illustrating an electronic apparatus 10 which is an embodiment of the present invention. The electronic apparatus 10 is a laptop PC. The present invention can be used for various electronic apparatuses such as a desktop PC, a tablet PC, a smart phone or a mobile phone, etc. Further, the present invention can also be applied to a so-called foldable PC, which includes a foldable display (organic EL type, etc.), for example.

As illustrated in FIG. 1, the electronic apparatus 10 includes a main body chassis 14 having input units such as a keyboard device 16, a touch pad 17, etc., and a rectangular plate-shaped display chassis 20 having a display device 18 comprised of a liquid crystal display or the like.

The main body chassis (chassis) 14 is a flattened rectangular box in which a bottom cover (first cover) 21 and a top cover (second cover) 22 are connected together. The bottom cover 21 and the top cover 22 are fixed by screw fixing portions 12 to constitute the main body chassis 14. The bottom cover 21 and the top cover 22 are, for example, a resin material. There are accommodated inside the main body chassis 14, various electronic parts such as a main substrate (electronic substrate) 24, a battery 26 (refer to FIG. 2), etc. The keyboard device 16 and the touch pad 17 are arranged in the central portion of the top cover 22 which constitutes the upper surface of the main body chassis 14.

The display chassis 20 is connected to the trailing edge portion of the main body chassis 14 via hinges 23 so that it can be opened and closed. The display chassis 20 is electrically connected to the main body chassis 14 by an unillustrated cable having passed through each of the hinges 23. The display device 18 is, for example, a liquid crystal display.

Figure 2:
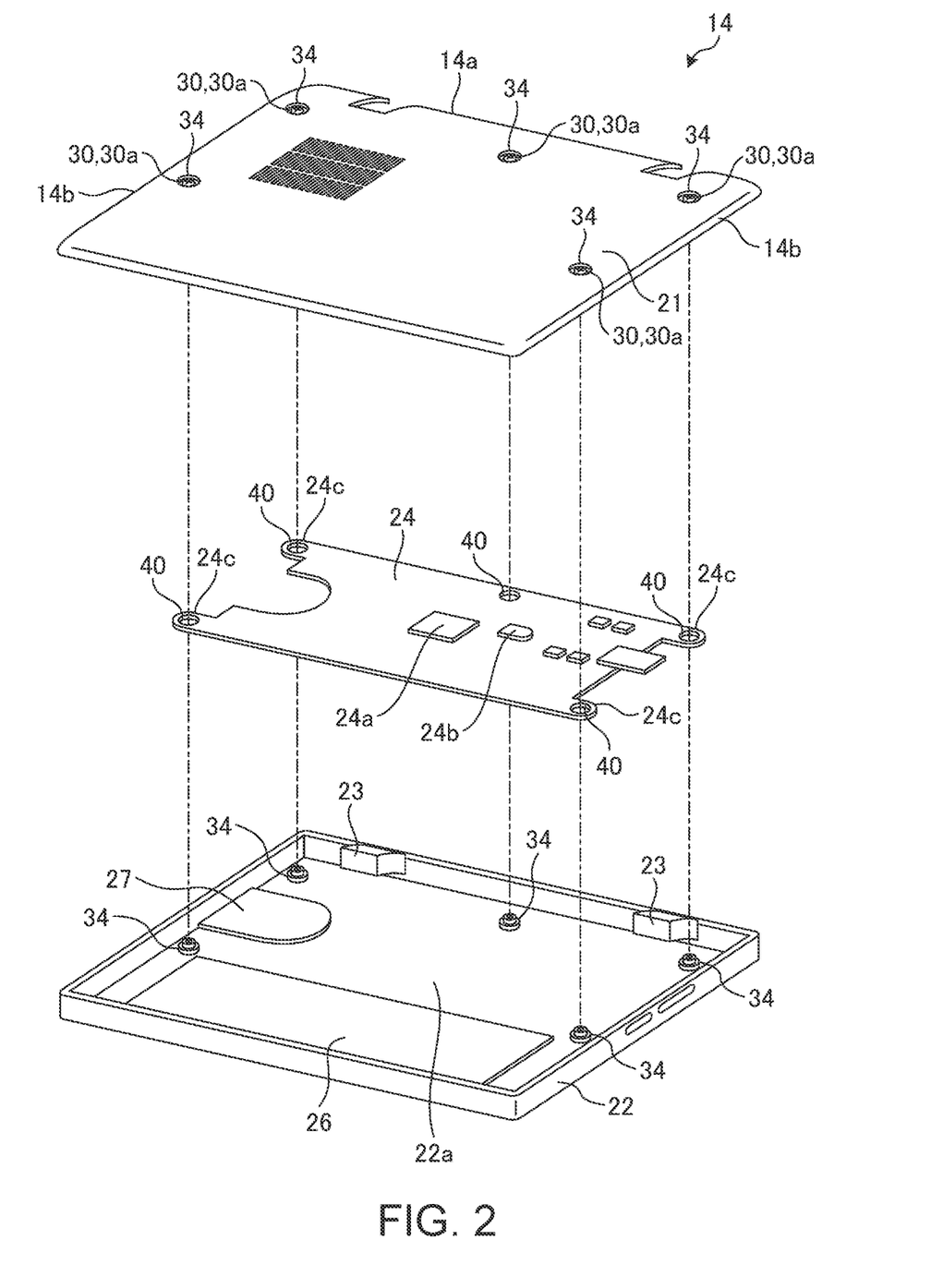
FIG. 2 is an exploded perspective view of a main body chassis as viewed obliquely from below.

FIG. 2 is an exploded perspective view of the main body chassis 14 as viewed obliquely from below. As illustrated in FIG. 2, the main substrate 24, the battery 26, a fan 27, and the like are accommodated in the top cover 22 in the main body chassis 14. A CPU 24a and an embedded controller (controller chip) 24b are mounted on the main substrate 24.

The CPU 24a generally controls the entire electronic apparatus 10 based on an OS (Operating System). The embedded controller 24b performs basic processing based on a BIOS (Basic Input Output System) and a UEFI (Unified Extensible Firmware Interface). Power for the embedded controller 24b is a so-called real-time clock power supply and is also supplied from a predetermined backup battery in addition to the battery 26, so that the embedded controller 24b can operate even when the electronic apparatus 10 is not activated or sleeps. The embedded controller 24b may be provided in a sub substrate different from the main substrate 24.

The screw fixing portions 12 are provided at a total of five points of a point along the trailing edge 14a of the main body chassis 14, points along both side edges 14b, and each neighborhood of the corners of the trailing edge 14a and the side edges 14b. Assume that the two or more screw fixing portions 12 are provided.

Figure 3:
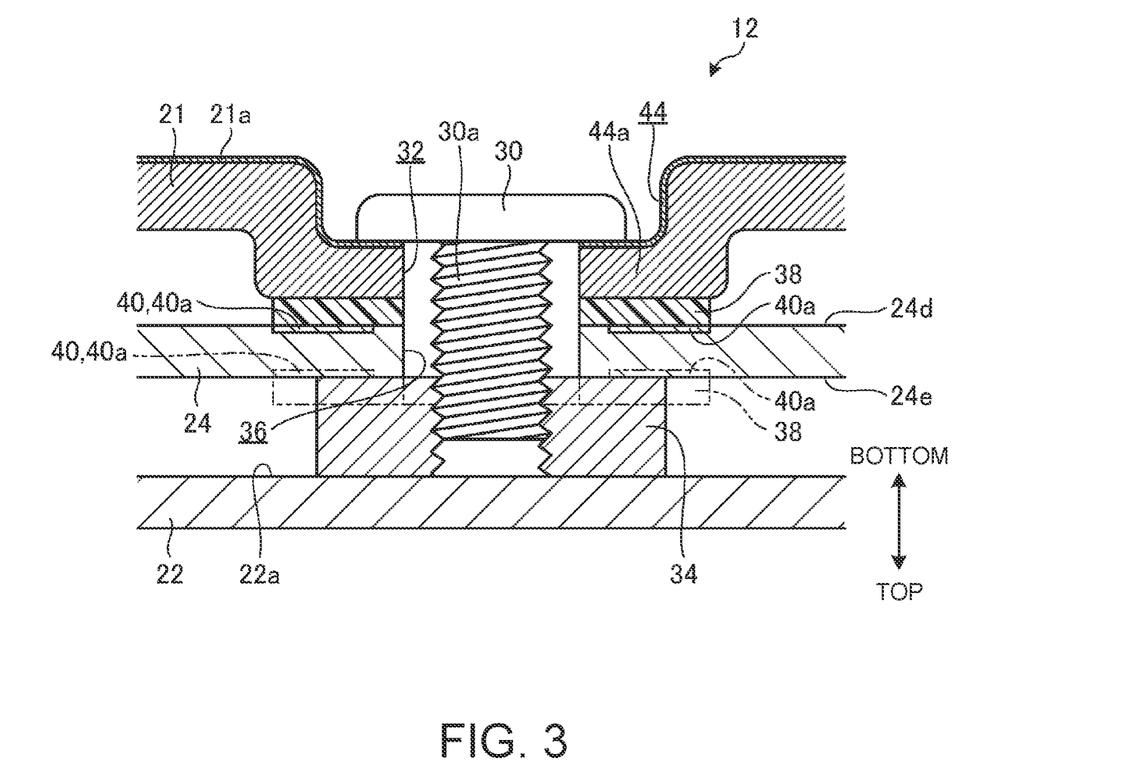
FIG. 3 is a sectional side view of a screw fixing portion.
Figure 4:
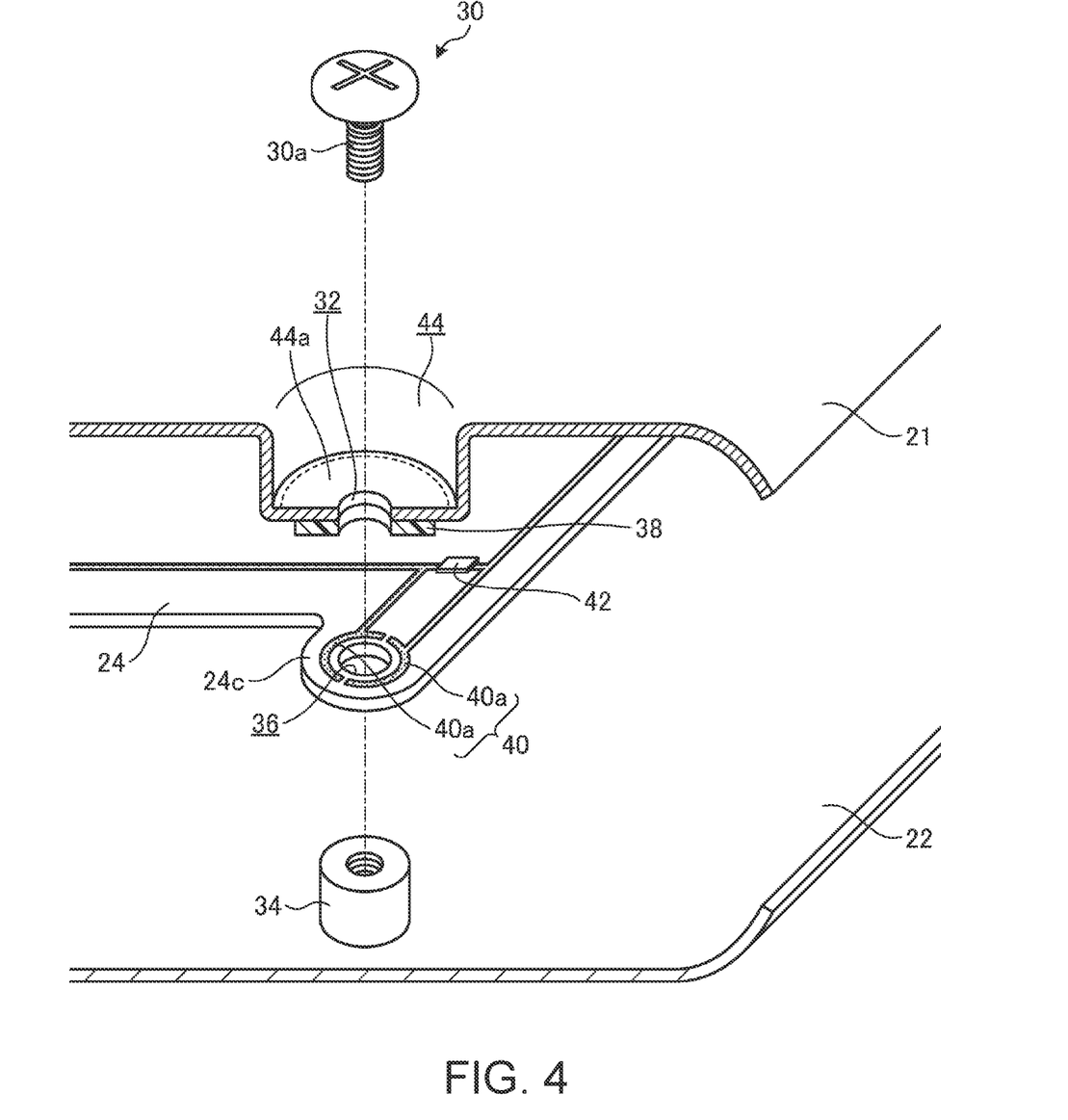
FIG. 4 is a partial sectional schematic perspective view of the screw fixing portion.

FIG. 3 is a sectional side view of the screw fixing portion 12. FIG. 4 is a partially sectional schematic perspective view of the screw fixing portion 12. The screw fixing portion 12 has a screw 30, a screw hole 32, a stud 34, a substrate hole 36, a conductive sponge (conductor) 38, a contact pair 40, and a voltage dividing resistor 42.

The screw hole 32 is formed in the bottom cover 21 and is a point through which the screw 30 is inserted. The screw hole 32 is formed in a bottom wall 44a of a recessed portion 44 in the bottom cover 21. The stud 34 allows the screw 30 to be screwed therein and is fixed to an internal surface 22a in the top cover 22. The substrate hole 36 is a point through which the screw 30 is inserted, and is formed at a point where it is interposed between the bottom wall 44a of the bottom cover 21 and the stud 34 at the main substrate 24. The main substrate 24 includes a plurality of convexes 24c (refer to FIG. 2), and some of the substrate holes 36 are formed in the convexes 24c.

The conductive sponge 38 is a sponge having conductivity and elasticity. The conductive sponge 38 is interposed between the bottom wall 44a of the bottom cover 21 and the main substrate 24 and surrounds the periphery of a threaded portion 30a at the screw 30. The conductive sponge 38 is annular and has a moderate thickness with which it is elastically sandwiched between the bottom wall 44a and the main substrate 24. The conductive sponge 38 is fixed to the bottom wall 44a by an adhesive or an adhesive tape or the like. The conductor provided around the screw 30 between the bottom cover 21 and the main substrate 24 may be a metal washer, a metal foil, metal plating on the inner surface of the bottom wall 44a, etc. even in addition to the conductive sponge 38.

The contact pair is made up of two lands 40a. The two lands 40a respectively have a substantially circular arc shape with an angle slightly smaller than 180°. The two lands 40a are arranged opposite to each other via a narrow gap therebetween so as to surround the substrate hole 36 on the surface (lower surface 24d in the case of this embodiment) of the main substrate 24 on the side facing the conductive sponge 38. The two lands 40a become conductive when the conductive sponges 38 come into contact therewith by the fastening of the screw 30. The voltage dividing resistor 42 is connected in parallel with the contact pair 40. The voltage dividing resistor 42 is surface-mounted onto the main substrate 24. A lower surface of the bottom cover 21 is covered with an insulating coating film 21a. In FIG. 4, the contact pair 40 and its connecting lines are indicated by dots for easy recognition thereof.

Figure 5:
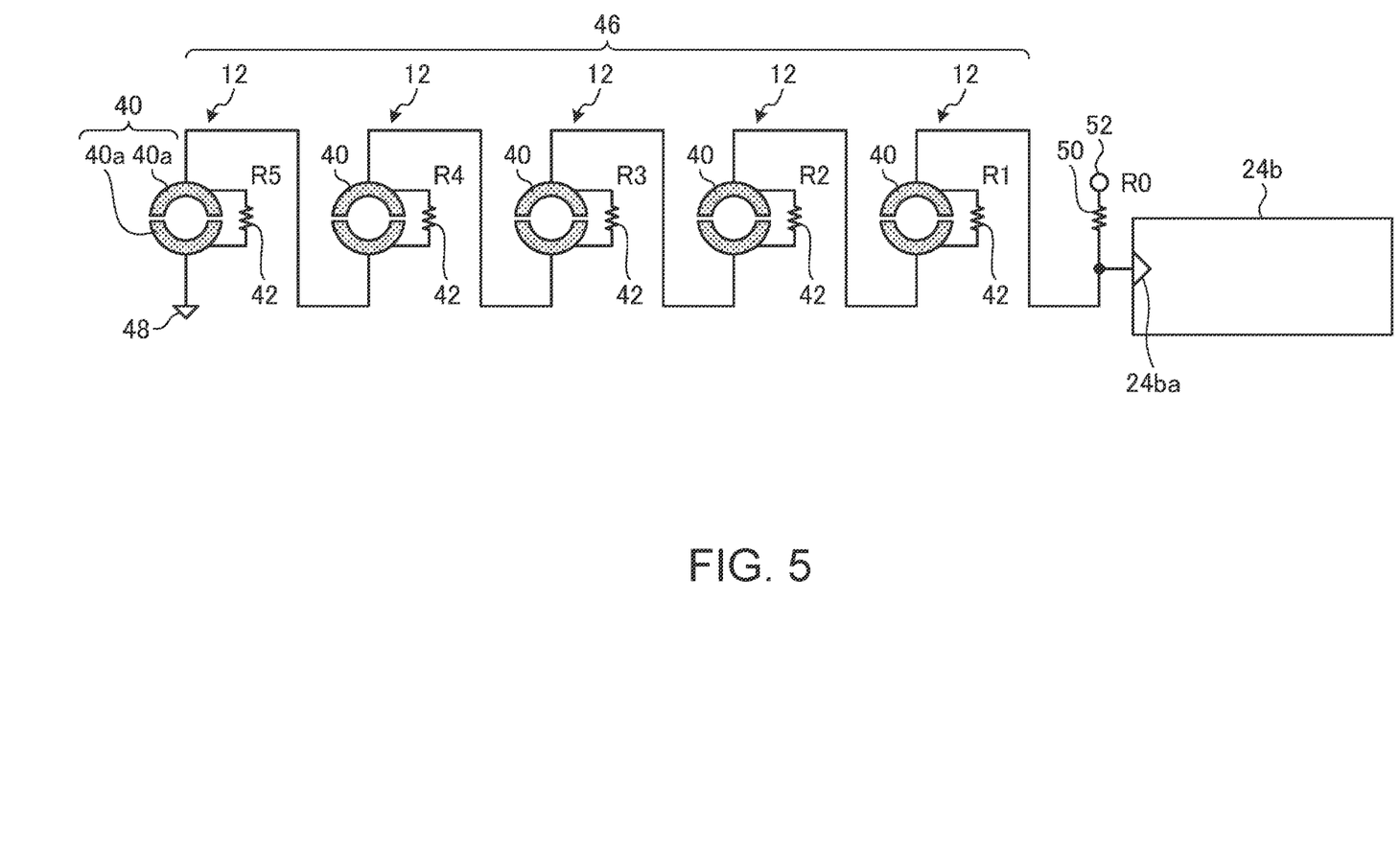
FIG. 5 is a circuit diagram illustrating a mode of connection between a contact pair and an embedded controller.

FIG. 5 is a circuit diagram illustrating a mode of connection between each contact pair 40 and the embedded controller 24b. The five contact pairs 40 form a series circuit 46 in which they are connected in series. One end of the series circuit 46 is connected to a ground 48 (one electrode of the power supply). The other end of the series circuit 46 is connected to a power supply 52 (the other electrode of the power supply) via a pull resistor 50 and connected to an input terminal 24ba of the embedded controller 24b. The input terminal 24*ba* is a terminal capable of analog input. The power supply 52 is the real-time clock power supply described above.

In FIGS. 5 through 8, codes R1, R2, R3, R4, and R5 each indicating a resistance value are attached to the voltage dividing resistors 42 in the respective screw fixing portions 12. Further, the resistance value of the pull resistor 50 is assumed to be R0. The resistance value of each of the voltage dividing resistors 42 is different from the total resistance value of any one or more of other voltage dividing resistors 42 excluding itself. For example, the resistance value R1 is different from other resistance values R2 to R5 and is also different from the combined resistance value of two or more of the resistance values R2 to R5.

Figure 6:
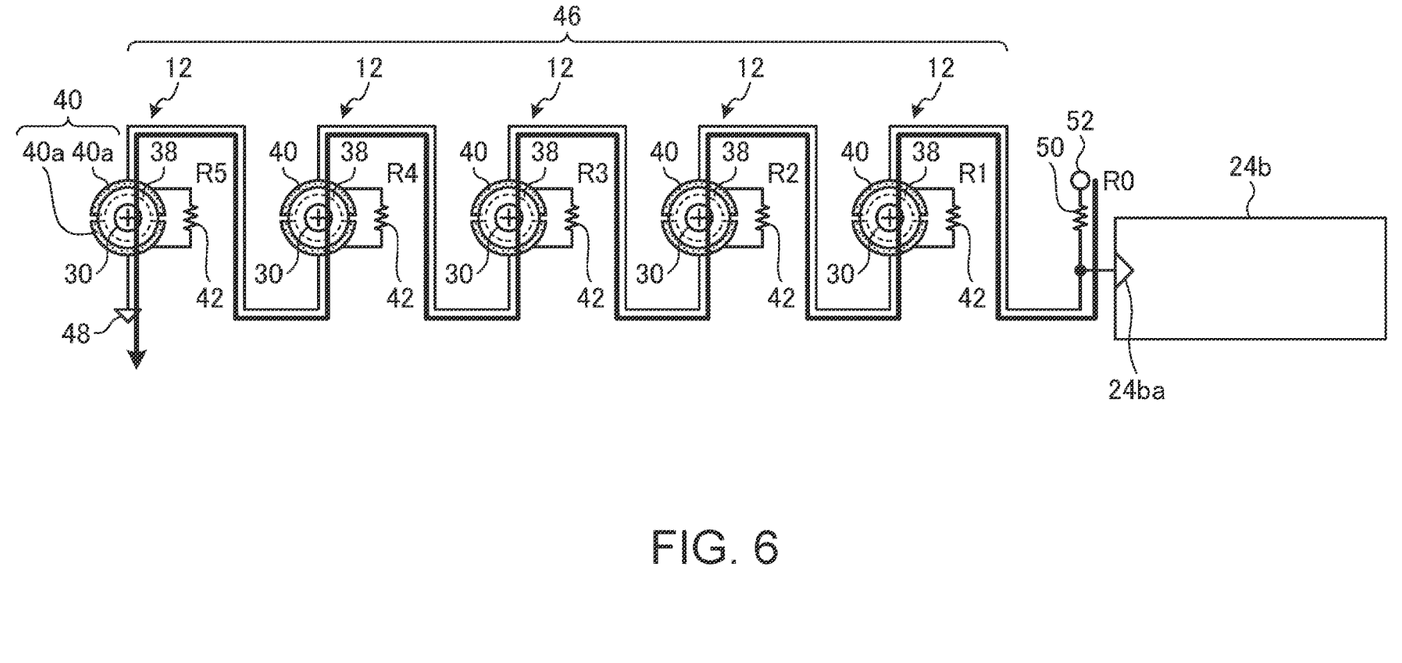
FIG. 6 is a circuit diagram illustrating a mode of connection between the contact pair and the embedded controller in a state in which a bottom cover and a top cover are closed.
Figure 7:
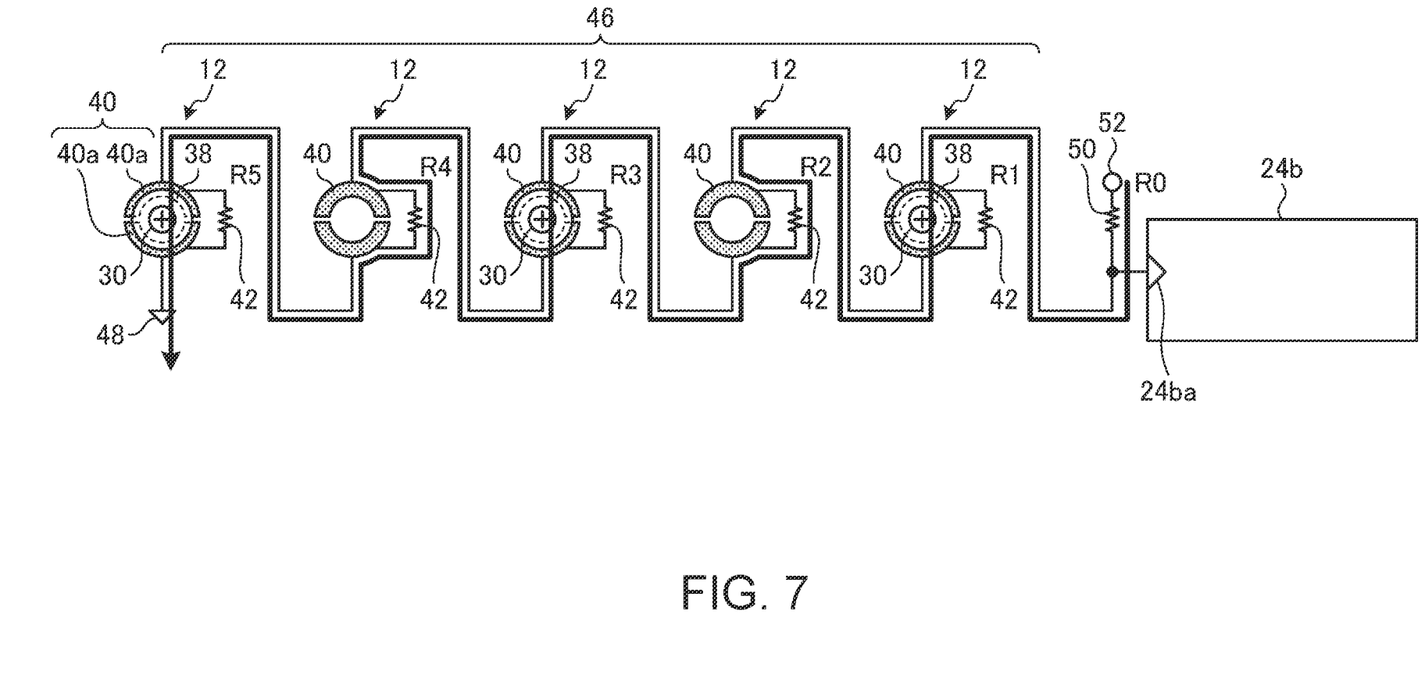
FIG. 7 is a circuit diagram illustrating a mode of connection between the contact pair and the embedded controller in a state in which the bottom cover and the top cover are partially open therebetween.

FIG. 6 is a circuit diagram illustrating a mode of connection between each contact pair 40 and the embedded controller 24*b* in the state in which the bottom cover 21 and the top cover 22 are closed. In FIGS. 6 and 7, arrows indicate the flow of current. Thus, in the state in which the bottom cover 21 and the top cover 22 are fixed and closed by the five screw fixing portions 12, each contact pair 40 is made conductive by the abutment of the conductive sponge 38 thereto, so that an input voltage detected by the embedded controller 24*b* becomes 0V. Since the voltage of the input terminal 24*ba* is 0V, the embedded controller 24*b* is capable of recognizing that the bottom cover 21 and the top cover 22 are in the state of being fixed and closed by the five screw fixing portions 12.

FIG. 7 is a circuit diagram illustrating a mode of connection between each contact pair 40 and the embedded controller 24*b* in the state in which the bottom cover 21 and the top cover 22 are partially open therebetween. Thus, when the screws 30 are removed at the screw fixing portions 12 corresponding to the voltage dividing resistors 42 of the resistance values R2 and R4, and the conductive sponges 38 no longer exist, the contact pairs 40 in such parts become non-conductive. Then, as indicated by the arrow, the current flows through the voltage dividing resistors 42 so as to bypass at the points where the contact pairs 40 are non-conducting. Therefore, since a voltage divided by the resistance value R0 and the resistance value (R2+R4) is applied to the input terminal 24*ba*, the embedded controller 24*b* recognizes that the bottom cover 21 and the top cover 22 are in the state in which they are partially open therebetween. In this case, when a prompt is made to enter a prescribed password on the screen under the action of the embedded controller 24*b*, and the correct password is not entered, predetermined operation restriction processing is performed to prevent operation by an unauthorized person.

The embedded controller 24*b* can recognize based on the voltage value of the input at the input terminal 24*ba*, the number of points where the screws 30 and the conductive sponges 38 are removed from the five screw fixing portions 12, and the contact pairs 40 are non-conducting. When it is recognized that the number of points is a predetermined number or more (for example, two or more), the embedded controller 24*b* performs the operation restriction processing via the above password input request. Consequently, although it is a rare case, even if the contact pair 40 becomes non-conductive only at one point due to some factors such as vibrations, it is possible to prevent erroneous detection and erroneous processing.

Since the respective resistance values of the voltage dividing resistors 42 are different as described above, the embedded controller 24*b* can identify based on the input voltage of the input terminal 24*ba*, at which portion of the five screw fixing portions 12, the screw 30 and the conductive sponge 38 are removed. Further, since each resistance value is set to be different from the total resistance value of any one or more of other voltage dividing resistors 42 excluding itself, it is possible to distinguish and detect that the contact pair 40 at one predetermined point has become non-conductive, and the contact pairs 40 at other multiple points have become non-conductive. With this identification, for example, when the contact pair 40 at any point frequently becomes non-conductive, it is judged that a mechanical failure has occurred at this point. This is reflected in subsequent detection processing or can be used as reference data for ex-post design.

Although there are provided the screw fixing portions 12 at the five points in the present embodiment, they are preferably provided in at least three points along the three edges at the main body chassis 14, i.e., the trailing edge 14*a* and the side edges 14*b* on both sides. Since each edge is different in position and direction, the vibration mode differs. Even if the contact pair 40 at one point becomes non-conductive due to the effect of some kind of vibration applied thereto, other points are not affected by vibration, and the erroneous detection can be prevented.

Even when a plurality of (N, for example) screw fixing portions 12 are provided, and the contact pairs 40 other than one of all the screw fixing portions 12 (N−1 points) become non-conductive, the embedded controller 24*b* naturally performs operation restriction processing. Therefore, even if the screw 30 is made slightly loose only at one point, the screws 30 of all other screw fixing portions 12 are removed, and the bottom cover 21 is rotated about the point where the screw 30 is made loose, to expose the inside of the main body chassis 14, the embedded controller 24*b* can perform the operation restriction processing correctly based on the states of the four points where the screws 30 have been removed.

Incidentally, depending on design conditions, in order just to cope with the fact that such a bottom cover 21 is rotated to expose the inside of the main body chassis 14, the operation restriction processing may be performed when the contact pair 40 becomes non-conductive even at one of the plurality of screw fixing portions 12. Since it is not necessary to identify the points where the contact pairs 40 become non-conductive or recognize the number of points, the voltage dividing resistor 42 in each screw fixing portion 12 may be omitted. Further, in this case, since the voltage applied to the input terminal 24*ba* of the embedded controller 24*b* becomes binary, a digital input terminal may be used.

Thus, since the plurality of screw fixing portions 12 are provided in the electronic apparatus 10, it is possible to reliably detect the removal of the bottom cover 21. Further, since the contact pairs 40 of the screw fixing portions 12 are connected in series, the embedded controller 24*b* is capable of monitoring the state of one input terminal 24*ba*.

Figure 8:
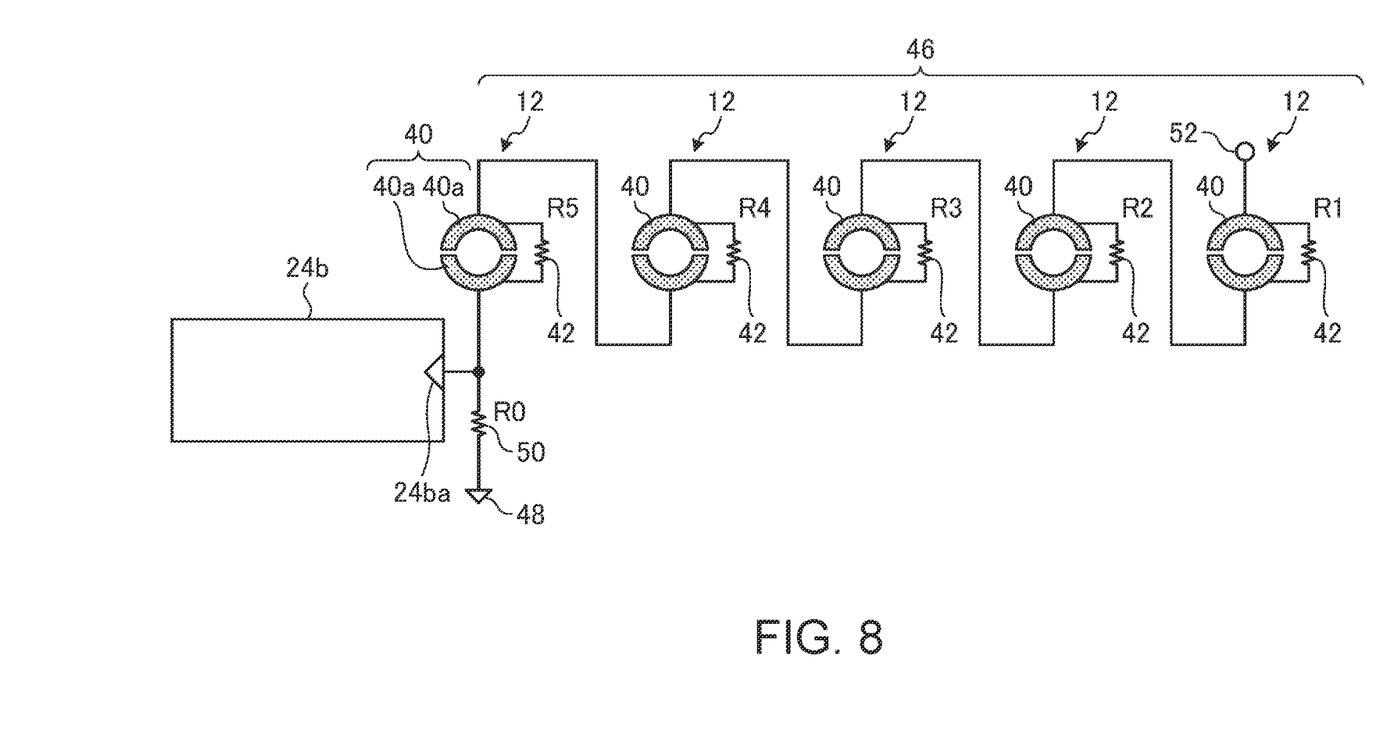
FIG. 8 is a circuit diagram according to a modification.

FIG. 8 is a circuit diagram according to a modification. In the circuit diagram illustrated in FIG. 8, the polarity is connected to be opposite to that illustrated in FIG. 5. That is, one end of the series circuit 46 is connected to the power supply 52, and the other end thereof is connected to the ground 48 via the pull resistor 50 and connected to the input terminal 24*ba*. Even in this circuit, only the polarities are different, and the same operation and effect as the above can be obtained.

Incidentally, in the above embodiment, the contact pair 40 is provided in the lower surface 24*d* of the main substrate 24, and the conductive sponge 38 is interposed between the main substrate 24 and the bottom wall 44*a* being a part of the first cover 21, but conversely, as indicated by the virtual line of FIG. 3, the contact pair 40 may be provided in the upper surface 24e of the main substrate 24, and the conductive sponge 38 may be interposed between the main substrate 24 and the stud 34. That is, the conductive sponge 38 may be interposed between the surface of the main substrate 24 in which the contact pair 40 is provided, and the first cover 21 or the stud 38.

It goes without saying that the present invention is not limited to above-described embodiments, and can be freely modified within the scope not departing from the gist of the present invention.

The invention claimed is:

1. An electronic apparatus comprising:
an electronic substrate in a chassis in which a first cover and a second cover are fixed by a plurality of screw fixing portions,
wherein each screw fixing portion includes:
   a screw,
   a screw hole in the first cover and configured to receive the screw,
   a stud on the second cover and configured to thread with the screw,
   a substrate hole configured to receive the screw at a point between the first cover and the stud at the electronic substrate,
   a conductor between the first cover or the stud and the electronic substrate and configured to be disposed around the screw, and
   a contact pair arranged opposite to each other and configured to surround the substrate hole on a surface of the electronic substrate on a side facing the conductor, and is further configured to contact and conduct with the conductor by fastening the screw,
wherein the plurality of screw fixing portions and a plurality of the contact pairs form a series circuit in which the contact pairs are connected in series,
wherein one end of the series circuit is connected to one electrode of a power supply, and another end of the series circuit is connected to another electrode of the power supply via a pull resistor and connected to an input terminal of a controller chip;
wherein each of the screw fixing portions has a voltage dividing resistor connected in parallel with the contact pairs, and
wherein the input terminal is a terminal capable of analog input.

2. The electronic apparatus according to claim 1, wherein the controller chip detects a number of points where the contact pairs are made non-conductive, from a voltage applied to the input terminal, and performs operation restriction processing when the number of points is two or more.

3. The electronic apparatus according to claim 1, wherein the resistance value of each of the voltage dividing resistors is different from a total resistance value of any one or more of the other voltage dividing resistors.

4. The electronic apparatus according to claim 1, wherein the conductor is a conductive sponge.

5. The electronic apparatus according to claim 1, wherein the chassis is rectangular, and
wherein the screw fixing portions are at points along at least three edges of the chassis.

6. An electronic apparatus comprising:
an electronic substrate in a chassis in which a first cover and a second cover are fixed by a plurality of screw fixing portions,
wherein each screw fixing portion includes:
   a screw,
   a screw hole in the first cover and configured to receive the screw,
   a stud on the second cover and configured to thread with the screw,
   a substrate hole configured to receive the screw at a point between the first cover and the stud at the electronic substrate,
   a conductor between the first cover or the stud and the electronic substrate and configured to be disposed around the screw, and
   a contact pair arranged opposite to each other and configured to surround the substrate hole on a surface of the electronic substrate on a side facing the conductor, and is further configured to contact and conduct with the conductor by fastening the screw,
wherein the plurality of screw fixing portions and a plurality of the contact pairs form a series circuit in which the contact pairs are connected in series,
wherein one end of the series circuit is connected to one electrode of a power supply, and another end of the series circuit is connected to another electrode of the power supply via a pull resistor and connected to an input terminal of a controller chip; and
wherein each of the screw fixing portions has a voltage dividing resistor connected in parallel with the contact pairs.

7. An electronic apparatus comprising:
an electronic substrate in a chassis in which a first cover and a second cover are fixed by a plurality of screw fixing portions,
wherein each screw fixing portion includes:
   a screw,
   a screw hole in the first cover and configured to receive the screw,
   a stud on the second cover and configured to thread with the screw,
   a substrate hole configured to receive the screw at a point between the first cover and the stud at the electronic substrate,
   a conductor between the first cover or the stud and the electronic substrate and configured to be disposed around the screw, and
   a contact pair arranged opposite to each other and configured to surround the substrate hole on a surface of the electronic substrate on a side facing the conductor, and is further configured to contact and conduct with the conductor by fastening the screw,
wherein the plurality of screw fixing portions and a plurality of the contact pairs form a series circuit in which the contact pairs are connected in series,
wherein one end of the series circuit is connected to one electrode of a power supply, and another end of the series circuit is connected to another electrode of the power supply via a pull resistor and connected to an input terminal of a controller chip; and
wherein the input terminal is a terminal capable of analog input.

* * * * *